(12) United States Patent  (10) Patent No.: US 6,990,860 B1
Gillanders  (45) Date of Patent: Jan. 31, 2006

(54) LOW FLUID LEVEL INDICATOR FOR HYDRATION BLADDER

(76) Inventor: David Douglas Gillanders, 1969 Chevy Chase Dr., Brea, CA (US) 92821

( * ) Notice: Subject to any disclaimer, the term of this patent is extended or adjusted under 35 U.S.C. 154(b) by 0 days.

(21) Appl. No.: 10/974,902

(22) Filed: Oct. 28, 2004

(51) Int. Cl.
*G01F 22/00* (2006.01)
*G01F 23/00* (2006.01)
*B65D 37/00* (2006.01)
*A45F 3/20* (2006.01)

(52) U.S. Cl. .................. 73/149; 73/290 R; 222/92; 222/95; 222/175; 224/148.1; 224/148.2; 224/148.3

(58) Field of Classification Search ............... 73/1.73, 73/1.74, 149, 290 R, 290 B, 291, 295, 296, 73/304 R, 304 C; 222/92, 95, 175; 224/148.1, 224/148.2, 148.3; 702/50, 55
See application file for complete search history.

(56) References Cited

U.S. PATENT DOCUMENTS

| | | | |
|---|---|---|---|
| 4,095,726 A * | 6/1978 | Hechler et al. ............. 222/175 |
| 4,526,298 A * | 7/1985 | Boxer et al. ................ 222/130 |
| 4,848,133 A * | 7/1989 | Paulis et al. ................. 73/1.73 |
| 5,348,539 A * | 9/1994 | Herskowitz ................. 604/141 |
| 5,790,422 A * | 8/1998 | Power et al. ............. 73/304 R |
| 5,879,329 A * | 3/1999 | Ginsburg ................. 604/98.01 |
| 5,894,089 A * | 4/1999 | Ogawa ........................ 73/295 |
| 6,212,959 B1 * | 4/2001 | Perkins ..................... 73/861.77 |
| 6,697,953 B1 * | 2/2004 | Collins ....................... 713/320 |
| 6,717,520 B1 * | 4/2004 | Dorenbosch ............. 340/636.1 |
| D505,540 S * | 5/2005 | Lien ........................... D3/202 |
| 2002/0002326 A1 * | 1/2002 | Causey et al. ............. 600/300 |
| 2005/0034478 A1 * | 2/2005 | Kreutzmann et al. ...... 62/457.3 |
| 2005/0115312 A1 * | 6/2005 | Curello et al. ................ 73/149 |

* cited by examiner

*Primary Examiner*—Hezron Williams
*Assistant Examiner*—David A. Rogers

(57) ABSTRACT

A method for indicating the relative fluid level of a personal hydration bladder, and for alerting the user that the bladder has been depleted to a predetermined level or levels. A non-invasive sensor detects changes in the bladder geometry and transmits the information to a indicating unit worn by the user.

32 Claims, 3 Drawing Sheets

LOW FLUID LEVEL INDICATOR FOR HYDRATION BLADDER

BACKGROUND

1. Field of Invention

This invention relates generally to the measurement or quantification of a volume of liquid, especially as used in personal hydration systems for individuals for carrying and supplying drinking water and electrolyte replacement fluids.

2. Prior Art

Personal hydration systems generally comprise a flexible bladder and a drinking tube, and are usually carried in a backpack or waist pack. A product popular with hikers, cyclists and skiers is sold under the trademark CamelBak, by CamelBak Products, Inc. of Petaluma, Calif. Numerous competitors offer similar products. To prevent leakage, the bladder is usually not vented and therefore collapses upon itself as the fluid is withdrawn. A flexible tube connects to the bladder and enables the user to withdraw fluid by creating suction on the other end of the tube. There is usually a mouthpiece with a valve attached to the tube to facilitate the withdrawal of the fluid into the user's mouth. The unit does not measure the fluid withdrawn, or the amount remaining in the reservoir. The unit generally does not notify the user that the reservoir is about to be depleted until actual depletion occurs.

Hydration bladders have numerous advantages over water bottles and flasks. The flexible drinking tube, usually combined with a bite-actuated mouthpiece valve, makes drinking easier during physical activity. Also, a greater volume and hence weight may be more efficiently carried by distributing the weight over a larger area. Finally, the bladder may be encased in an insulating sleeve, providing some degree of temperature control. However, a major disadvantage of hydration systems as compared to water bottles, is the monitoring of fluid levels. Water bottles may be visually inspected and/or shaken to easily confirm how much fluid remains as they are used. The hydration bladder is usually located on the individual's back, often deep inside of a backpack and obscured by other items in the backpack. The user of a hydration bladder typically has no warning that he is about to run out.

Knowledge of the volume of fluid remaining in the bladder is important for several reasons. First, it is crucial that the body remain properly hydrated, especially during physical activity. Knowing that the bladder was running low would enable the individual to refill it in a timely way, preserving her health and well being. Additionally, in the case of backpacking in wilderness areas, quite often there is a limited availability of sources for water. Since such sources often do not contain safe drinking water, the water must be filtered or treated with chemicals prior to drinking. Both these activities result in a time period elapsing before the water may be consumed. It would be a great advantage if an individual could easily know when the bladder had been depleted to a certain predetermined level or levels.

Prior-art methods of indicating fluid levels in containers, such as floats and optical proximity sensors are well documented. Chai, in U.S. Pat. No. 5,341,686 (August, 1994) teaches a vertical water meter, but Chai's meter is effective when used with rigid containers having a stable shape. A hydration bladder is a dynamic object whose geometry changes as fluid is withdrawn or added. Additionally, hydration bladders are not in a constant vertical position due to their being attached to the body of the user, and are subject to many degrees of motion. Further complicating this is the bladder's susceptibility to external pressure from other items loaded into a backpack.

Griffiths, et al., in U.S. Pat. No. 4,350,265 (September, 1982) teaches a liquid dispenser meter with for a liquid dispenser having an axially movable plunger. The operation of a personal hydration bladder is controlled by the user's mouth and the amount of liquid withdrawn naturally varies significantly, making Griffiths' liquid dispenser unsuitable.

Inline flow metering systems, such as taught by Perkins, U.S. Pat. No. 6,212,959 (April, 2001), can provide an indication of fluid volume, but only if the user manually calibrates or otherwise updates the system whenever fluid is put into the bladder. Then the system can deduct the amount of fluid withdrawn and provide an indication of remaining fluid. This method is impractical because bladders are often used in the outdoors and refilled or partially refilled from natural water sources, through filter/pump systems, or from additional containers of fluid, the exact volume of which may not be known. Perkins' meter system is "blind" to the amount added to the bladder and therefore cannot provide any warning as to when the bladder will empty. Additional disadvantages to flow meter systems are complexity, high cost, and failure potential from sub-freezing temperatures. Because they use invasive sensing, i.e., devices immersed in the fluid, and must be held to tight tolerances due the low flow rates encountered in this application, flow meter systems are also vulnerable to fouling from nutritional additives and sports drinks, which are often mixed into the water. The interactive hydration prompt feature of flow meter systems has merit, but has limitations in that the system does not account for ambient temperature, relative humidity, actual perspiration loss, and exertion level of the user—all of which are determinants of optimal re-hydration rates.

Magnetically actuated reed switches are well known in the prior art. They comprise a pair of low-reluctance ferromagnetic reeds that overlap at their free ends (the contact area). When a magnetic field is brought into proximity with the reeds, the extreme ends of the reeds become magnetized, each assuming the opposite magnetic polarity. When the field becomes strong enough, i.e., the magnet is at the desired proximity, the overlapping ends attract and join together, completing the electrical circuit. When the field is removed, the reeds lose their magnetic properties and separated through their own spring tension, breaking the electrical circuit.

Angular Displacement Sensors are well known in the prior-art as devices which can detect angular displacement or bending. Gentile, et al, U.S. Pat. No. 5,086,785 (February, 1992) discloses a substrate, which may be attached to an object and will change its resistance as it is bent.

Additionally, the weight of a device used for the purpose of alerting the user of a personal hydration system to fluid levels is an important consideration. Since the user will carry it, it is essential that the weight be kept to minimum. The devices discussed above would add an undesirable amount of bulk and weight to the payload carried by the user.

OBJECTS AND ADVANTAGES

Accordingly, one object and advantage of the present invention is to provide a practical, affordable, lightweight means to conveniently notify the user of a hydration bladder when the fluid level in the bladder has diminished to a known level, or levels. Other objects and advantages are to provide a non-invasive means of achieving the desired result. Additional objects and advantages will become apparent from a consideration of the drawings and ensuing descriptions thereof.

SUMMARY

In accordance with the invention, the volume of a hydration bladder is monitored by measuring geometry changes in the bladder as liquid is added or withdrawn. In the preferred embodiment, a sensor or plurality of sensors detects the distance between the bladder walls. In an alternative embodiment, an angular displacement sensor detects the shape change in a bladder wall as liquid is added or withdrawn. This information is processed and reported to the user for the purpose of informing him as to the relative fluid level of the bladder.

REFERENCE NUMERALS

12 Prior-art hydration bladder
13 Mouthpiece and Drinking Tube
14 Lower Magnetically Actuated Reed Switch
15 Upper Magnetically Actuated Reed Switch
16 Upper Magnet
17 Lower Magnet
18 Fluid
19 Filler Cap
20 Cable
21 Display Pendant
22 Angular Displacement Sensor
23 Audiovisual Alarm Pendant
24 Cable Connector
25 Alarm Lamp
26 Test Switch Button
27 Clip

PREFERRED EMBODIMENT
DESCRIPTION—FIGS. 1, 2, 3, 4, 5, 6, 10, 11

Figure 1:
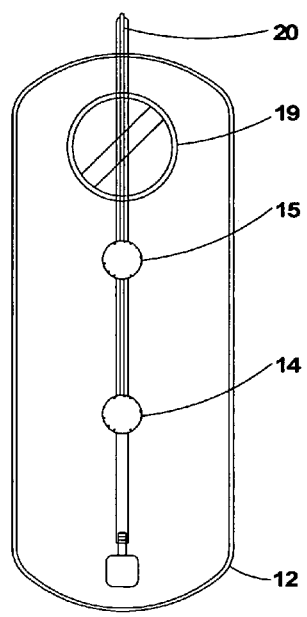
FIG. 1 is a rear plan view of a preferred embodiment of a low fluid level indicator for a hydration bladder, attached to a typical prior-art bladder.
Figure 2:
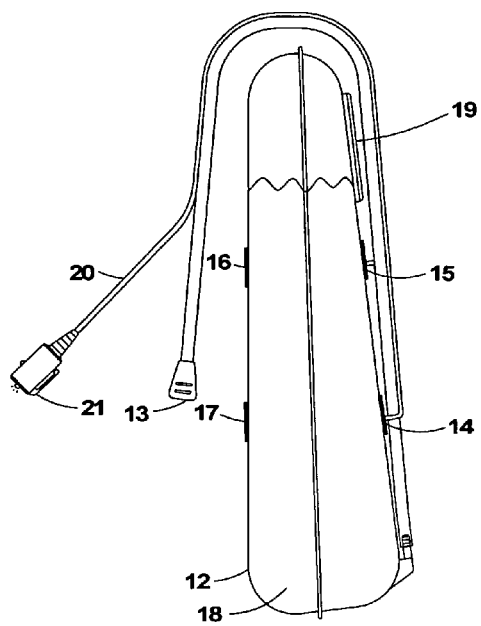
FIG. 2 is a left side plan view of a preferred embodiment of the indicator attached to a filled bladder.
Figure 3:
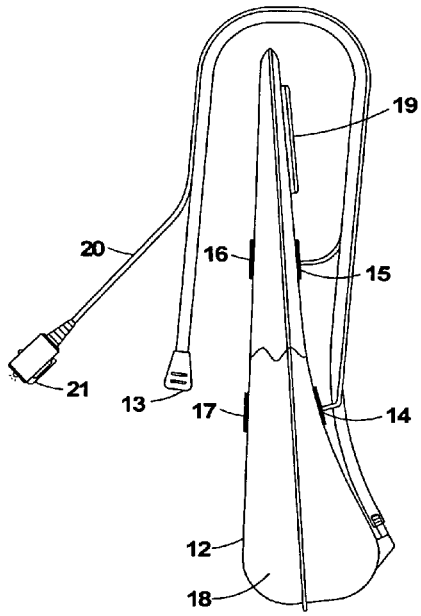
FIG. 3 is a left side plan view of a preferred embodiment of the indicator attached to a partially emptied bladder.
Figure 4:
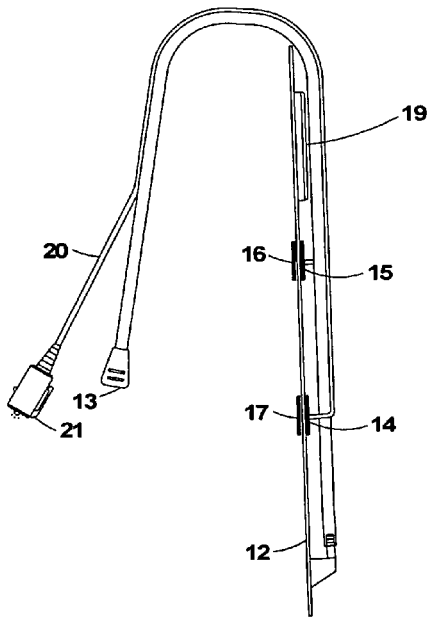
FIG. 4 is a left side plan view of a preferred embodiment of the indicator attached to an empty bladder.
Figure 5:
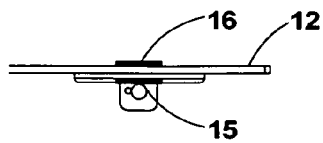
FIG. 5 is a top plan view of a preferred embodiment of the indicator attached to an empty bladder.
Figure 6:
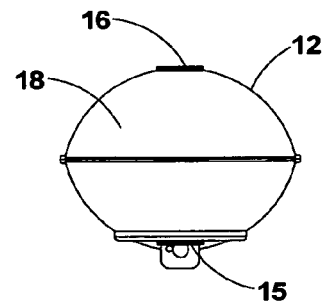
FIG. 6 is a top plan view of a preferred embodiment of the indicator attached to a filled bladder.
Figure 10:
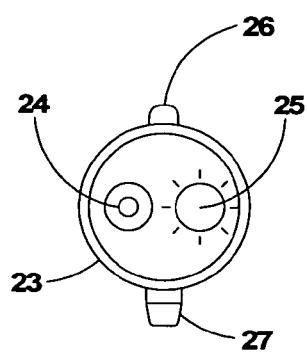
FIG. 10 is a top plan view of an audiovisual alert pendant, for use with the indicator in FIGS. 1–6.
Figure 11:
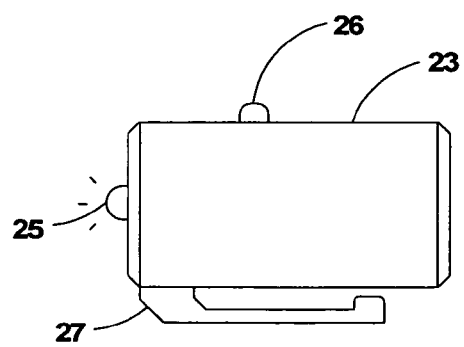
FIG. 11 is a side plan view of an audiovisual alert pendant, for use with the indicator in FIGS. 1–6.

A prior-art hydration bladder 12 (FIG. 1) with a mouthpiece and drinking tube 13 (FIG. 2) and filler cap 19 (FIG. 1). The bladder is typically constructed of flexible urethane material and has a generally rectangular shape has length and width dimensions of approximately 18 inches by 7 inches, depending on the designated fluid volume capacity. The bladder has lower and upper magnetically actuated reed switches 14 and 15 (FIG. 1) affixed to the exterior of one side of the bladder. Corresponding upper and lower magnets 16 and 17 (FIG. 2) are affixed on the exterior opposing side of the bladder, proximal to the reed switches. This arrangement provides two alert levels. One reed switch and one magnet may be used as well, for a single-alert level. The desired levels of alert, i.e., amount of remaining fluid 18 (FIG. 2) in the bladder upon alert, are determined by the placement of the reed switches and magnets. The amount of fluid remaining when the reed switch is actuated increases as the switch position is moved up, or closer to a filler cap 19. The switches are connected to an electrical cable 20 (FIG. 1). The cable's distal end terminates in a detachable connector 24 (FIG. 10). A wireless transmission can alternatively be employed between the switch and the pendant, which would obviate the need for the cable. An audiovisual alarm pendant 23 (FIG. 10) with a receptacle for cable 24 is comprises an electrical circuit, an alarm lamp 25 (FIG. 10), an audio indicator, not shown, and a battery, not shown. A test switch with a button 26 (FIG. 10) is provided to test the system operation. A clip 27 (FIG. 11) is provided to attach the audiovisual pendant to the user's backpack strap, pocket, or other convenient location.

Operation

The user of the indicator fills bladder 12 with any desired hydration fluid 18. The filled bladder is then loaded into a backpack or waist pack, not shown. At times, the bladder may also be inserted into a fitted, insulated sleeve. The mouthpiece, secured to the distal end of the drinking tube 13, generally will include a bite valve (not shown), which is typically opened with the user's mouthparts. This arrangement gives some control to the fluid flow and reduces foreign matter from entering the drinking tube. The mouthpiece and drinking tube is routed and positioned for easy access by the user. The cable 20 is connected at the proximal end, to switches 14 and 15, and at the distal end to audiovisual pendant 23. The cable is routed, usually adjacent to the drinking tube, to a convenient location for the user, and the audiovisual pendant is attached to the user's backpack strap or pocket or other convenient location, with the clip 27. When the user applies suction to the open drinking tube, fluid will be withdrawn from the bladder into the mouth of the user. As the user continues to drink, the bladder will deplete and the walls of the bladder will begin to collapse beginning at the upper end, distal to the drinking tube connection. The magnets 16 and 17 are selected so that each switch will be actuated when the walls of the bladder are approximately one-half inch from contacting each other. The actuation of upper switch 15 by upper magnet 16 will close the electrical circuit and the pendant will produce an audiovisual alarm to the user. In the case of a 100-ounce capacity bladder, this actuation will occur after approximately 30 fluid ounces have been depleted from the bladder. As the bladder continues to be depleted, the lower portion of the bladder walls will collapse and cause lower magnet 17 to actuate lower reed switch 14. This actuation will occur after approximately 60 fluid ounces have been depleted from the bladder. The actuation will close another circuit and the pendant will produce a differing audiovisual alarm. When the bladder is refilled, the fluid will again distend the walls of the bladder, separating the magnets from the reed switch, causing the switches to open the circuit again. A single magnet and reed switch or a plurality of magnets and switches may be used to provide and single or multiple levels of alert. Other, solid state switches can be used in place of the reed switch, with comparable results.

Figure 7:
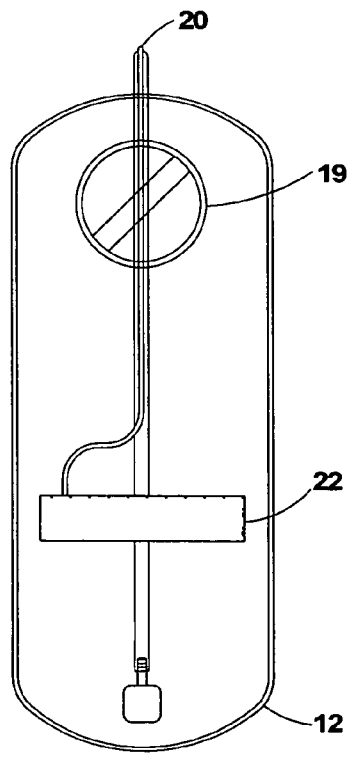
FIG. 7 is a rear plan view of an alternative embodiment of a low fluid level indicator for a hydration bladder, attached to a typical prior-art bladder.
Figure 8:
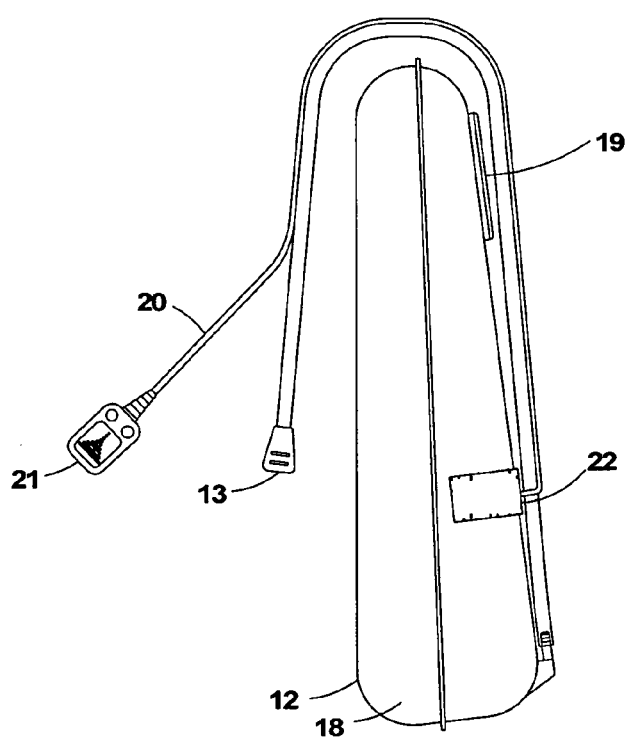
FIG. 8 is a left side plan view of an alternate embodiment of the invention attached to a filled bladder.
Figure 9:
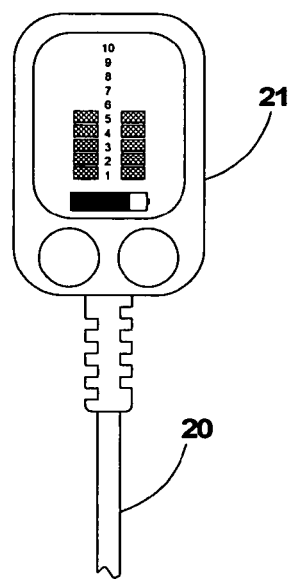
FIG. 9 is a top plan view of an alphanumeric display pendant with a vibrating and audio alert, for use with the indicator in FIG. 7.

Alternative Embodiment Description—FIGS. 7, 8, 9

FIG. 7 shows a prior-art hydration bladder 12 with mouthpiece and drinking tube 13. An angular displacement sensor 22 is affixed to the exterior bladder wall at right angles to the long axis of the bladder and approximately one-third of the bladder length from the lower, or discharge end of the bladder. The sensor comprises a substrate, which when deflected produces a change in electrical resistance. Cable 20 electrically couples the sensor to display pendant 21 (FIG. 8). The pendant may have an alphanumerical, audible, tactile, and/or graphic display. The graphic display may show a bar graph, and can display a graphical representation of the shape of the bladder, as reported by the angular displacement sensor. This enables the user to see the bladder shape change from a distended to a flat geometry as fluid is withdrawn, providing an indication of fluid volume status. An audible alert preferably is given to the user when the geometry is at a predetermined shape. A detachable electrical connector, not shown, preferably is provided for separation of the cable from the pendant. A wireless transmission can be employed between the angular displacement sensor and the display pendant, which would obviate the need for the cable.

Alternative Embodiment Operation

The user fills bladder 21 with desired hydration fluid 18. The filled bladder is then loaded into a backpack or waist pack. The bladder may also be inserted into a fitted, insulated sleeve. Mouthpiece and drinking tube 20 is routed to a convenient position for the user. The mouthpiece generally will include a bite valve, which gives some control to the fluid flow and reduces foreign matter from entering the drinking tube. Cable 20 is routed, usually adjacent to the drinking tube, to a convenient location for the user. The cable is connected to display pendant 21 and the pendant is attached to the user's backpack strap or pocket or other convenient location. When the user applies suction to the open drinking tube, fluid will be withdrawn from the bladder into the mouth of the user. As the user continues to drink, the bladder will deplete and the walls of the bladder will begin to collapse and the shape of the bladder will change from a distended asymmetrical radius, to a flat geometry. The change in shape of the bladder wall is sensed and reported to the display pendant. The fact of the correlation between bladder wall shape and bladder liquid volume enables the user to know the relative liquid level in the bladder. When the bladder is refilled, the fluid will again distend the walls of the bladder, which will be reported to the display pendant by the angular displacement sensor as a change in resistance.

CONCLUSION, RAMIFICATIONS, AND SCOPE

Accordingly, the reader will see that, according to the invention, I have provided an indicator which will inform the user of a personal hydration bladder with information as to the amount of fluid contained in the bladder and which will greatly aid and facilitate the maintenance of adequate body hydration levels.

While the above description contains many specificities, these should not be construed as limitations on the scope of the invention, but as exemplifications of the presently preferred embodiments. Many other ramifications and variations are possible within the teachings of the invention. For example, other types of sensors may be employed to gauge the size and/or shape of the bladder at various fluid quantity levels and, with the appropriate data processing, provide the user with useful information. In addition, although the preferred embodiments use a wire link between sensing and display devices, other arrangements may be constructed, including wireless signal transmission technology.

Other types of and combinations of alerts can also be utilized, employing visual, audio, and tactile methods.

Additionally, the indicator can be used with other types of bladders. These include, but are not limited to, gasoline and other fuel bladders, large water storage bladders, and bladders used for storage of compressed air and other gases.

Thus the scope of the invention should be determined by the appended claims and their legal equivalents, and not by the examples given.

I claim:

1. In a personal hydration system of the type to be worn or carried by a person, the hydration system comprising a flexible, refillable bladder for holding a consumable liquid and a flexible drinking tube connected to the bladder to allow for the consumption of the liquid, the improvement comprising:
    a first sensor coupled to the hydration system, the first sensor outputting a signal in response to changes in the flexible bladder's geometry resulting from consumption of the liquid; and
    a monitoring device, the monitoring device receiving the signal from the first sensor and providing an indication based on the signal that relates to the amount of liquid remaining in the flexible bladder.

2. The improvement as in claim 1 wherein the first sensor transmits the signal to the monitoring device using a cable.

3. The improvement as in claim 1 wherein the first sensor transmits the signal to the monitoring device using wireless transmission.

4. The improvement as in claim 1 wherein said first sensor is a magnetically actuated switch.

5. The improvement as in claim 1 wherein said first sensor is a lower sensor and wherein the improvement further comprises a second sensor, said second sensor being an upper sensor.

6. The improvement as in claim 5 wherein said second sensor outputs a signal to the monitoring device before said first sensor.

7. The improvement as in claim 5 wherein said first and second sensors are each magnetically actuated switches.

8. The improvement as in claim 5 wherein the first and second sensors transmit their signals to the monitoring device using a cable.

9. The improvement as in claim 5 wherein the first and second sensors transmits their signals to the monitoring device using wireless transmission.

10. The improvement as in claim 1 wherein the monitoring device further comprises a test switch.

11. The improvement as in any one of claims 1 to 10 wherein said indication is an audiovisual alarm.

12. The improvement as in any one of claims 1 to 10 wherein said indication is tactile.

13. The improvement as in any one of claims 1 to 10 wherein said indication is a graphical display.

14. The improvement as in claim 13 wherein said graphical display is a bargraph.

15. In a personal hydration system of the type to be worn or carried by a person, the hydration system comprising a flexible, refillable bladder for holding a consumable liquid and a flexible drinking tube connected to the bladder to allow for the consumption of the liquid, the improvement comprising:
- a plurality of sensors coupled to the hydration system, each of the plurality of sensors being spaced along a length of the hydration system and wherein each of the plurality of sensors are capable of outputting a signal in response to changes in the flexible bladder's geometry resulting from consumption of the liquid; and
- a monitoring device, the monitoring device receiving the signals from each of the plurality of sensors and providing an indication based on the signals that relates to the amount of liquid remaining in the flexible bladder.

16. The improvement as in claim 15 wherein a cable is used to transmit the signals to the monitoring device.

17. The improvement as in claim 15 wherein each sensor transmits its signal to the monitoring device using wireless transmission.

18. The improvement as in claim 15 wherein each of the sensors are magnetically actuated switches.

19. The improvement as in claim 15 wherein the monitoring device further comprises a test switch.

20. The improvement as in any one of claims 15 to 19 wherein said indication is an audiovisual alarm.

21. The improvement as in any one of claims 15 to 19 wherein said indication is tactile.

22. The improvement as in any one of claims 15 to 19 wherein said indication is a graphical display.

23. The improvement as in claim 22 wherein said graphical display is a bargraph.

24. In a personal hydration system of the type to be worn or carried by a person, the hydration system comprising a flexible, refillable bladder for holding a consumable liquid and a flexible drinking tube connected to the bladder to allow for the consumption of the liquid, the improvement comprising:
- an angular displacement variable resistor coupled to the hydration system's bladder that is capable of outputting a signal in response to changes in the flexible bladder's geometry resulting from consumption of the liquid; and
- a monitoring device, the monitoring device receiving a signal from the angular displacement variable resistor and providing an indication based on the signal that relates to the amount of liquid remaining in the flexible bladder.

25. The improvement as in claim 24 wherein the angular displacement variable resistor transmits the signal to the monitoring device using a cable.

26. The improvement as in claim 24 wherein the angular displacement variable resistor transmits the signal to the monitoring device using wireless transmission.

27. The improvement as in claim 24 wherein the monitoring device further comprises a test switch.

28. The improvement as any one of claims 24 to 27 wherein said indication is an audiovisual alarm.

29. The improvement as any one of claims 24 to 27 wherein said indication is tactile.

30. The improvement as any one of claims 24 to 27 wherein said indication is a graphical display.

31. The improvement as in claim 30 wherein said graphical display is a bargraph.

32. The improvement as in claim 30 wherein said graphical display is a graphical representation of the shape of said flexible bladder geometry.

* * * * *